(12) United States Patent
Habarou et al.

(10) Patent No.: US 8,496,431 B2
(45) Date of Patent: Jul. 30, 2013

(54) TURBINE RING ASSEMBLY FOR GAS TURBINE

(75) Inventors: Georges Habarou, Le Bouscat (FR); Julien Mateo, Le Pian Medoc (FR); Eric Bouillon, Le Haillan (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 775 days.

(21) Appl. No.: 12/531,113

(22) PCT Filed: Mar. 14, 2008

(86) PCT No.: PCT/FR2008/050444
§ 371 (c)(1),
(2), (4) Date: Nov. 5, 2009

(87) PCT Pub. No.: WO2008/132363
PCT Pub. Date: Nov. 6, 2008

(65) Prior Publication Data
US 2010/0111678 A1    May 6, 2010

(30) Foreign Application Priority Data
Mar. 15, 2007   (FR) .................................. 07 53841

(51) Int. Cl.
*F01D 9/04* (2006.01)
(52) U.S. Cl.
USPC ................................................... 415/170.1
(58) Field of Classification Search
USPC ............ 415/134, 135, 137, 138, 174.3, 170.1
See application file for complete search history.

(56) References Cited

U.S. PATENT DOCUMENTS

| | | | | |
|---|---|---|---|---|
| 4,087,199 A | * | 5/1978 | Hemsworth et al. | 415/173.3 |
| 4,472,108 A | * | 9/1984 | Pask | 415/113 |
| 4,522,559 A | * | 6/1985 | Burge et al. | 415/196 |
| 4,790,052 A | | 12/1988 | Olry | |
| 5,037,273 A | * | 8/1991 | Krueger et al. | 416/190 |
| 5,080,557 A | | 1/1992 | Berger | |
| 5,226,217 A | * | 7/1993 | Olry et al. | 28/107 |
| 5,988,975 A | * | 11/1999 | Pizzi | 415/139 |
| 6,042,334 A | * | 3/2000 | Schilling | 415/173.7 |
| 6,048,170 A | * | 4/2000 | Dodd | 415/135 |
| 6,113,349 A | * | 9/2000 | Bagepalli et al. | 415/135 |
| 6,291,058 B1 | * | 9/2001 | Goujard et al. | 428/293.4 |
| 6,699,607 B1 | | 3/2004 | Spitsberg | |
| 6,759,151 B1 | * | 7/2004 | Lee | 428/701 |
| 7,278,820 B2 | * | 10/2007 | Keller | 415/173.1 |
| 7,393,182 B2 | * | 7/2008 | Matheny | 416/181 |
| 8,167,546 B2 | * | 5/2012 | Shi et al. | 415/173.1 |

(Continued)

FOREIGN PATENT DOCUMENTS

| | | | |
|---|---|---|---|
| EP | 1350927 | | 10/2003 |
| GB | 2343224 | | 5/2000 |
| JP | 10231702 A | * | 9/1998 |
| WO | WO 96/30317 | | 10/1996 |

*Primary Examiner* — Edward Look
*Assistant Examiner* — Christopher R Legendre
(74) *Attorney, Agent, or Firm* — Preti Flaherty Beliveau & Pachios LLP

(57) ABSTRACT

A turbine ring assembly for a gas turbine, the assembly having a complete ring forming a single piece of ceramic matrix composite material (CMC), a metal structure for supporting the CMC ring having metal annular supports between which the CMC ring is placed while allowing differential expansion at least in a radial direction between the CMC ring and the annular supports, an arrangement for centering the CMC ring, and at least one element for preventing turning of the CMC ring about its axis.

23 Claims, 6 Drawing Sheets

U.S. PATENT DOCUMENTS

| | | |
|---|---|---|
| 2004/0047726 A1 | 3/2004 | Morrison |
| 2004/0211354 A1* | 10/2004 | Guirman et al. ............... 117/13 |
| 2005/0158168 A1 | 7/2005 | Bruce et al. |
| 2009/0208322 A1* | 8/2009 | McCaffrey .................. 415/113 |
| 2010/0092281 A1* | 4/2010 | Habarou et al. .............. 415/200 |
| 2010/0111678 A1* | 5/2010 | Habarou et al. ........... 415/173.3 |

* cited by examiner

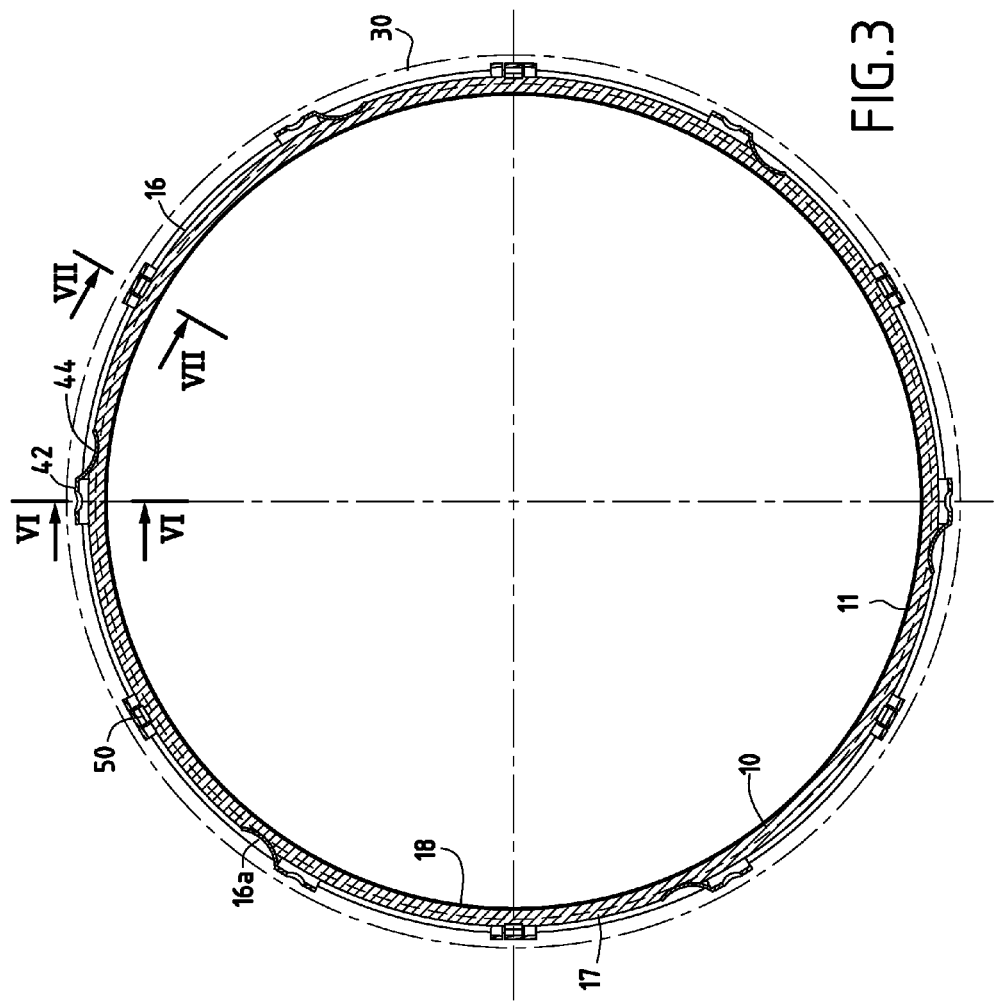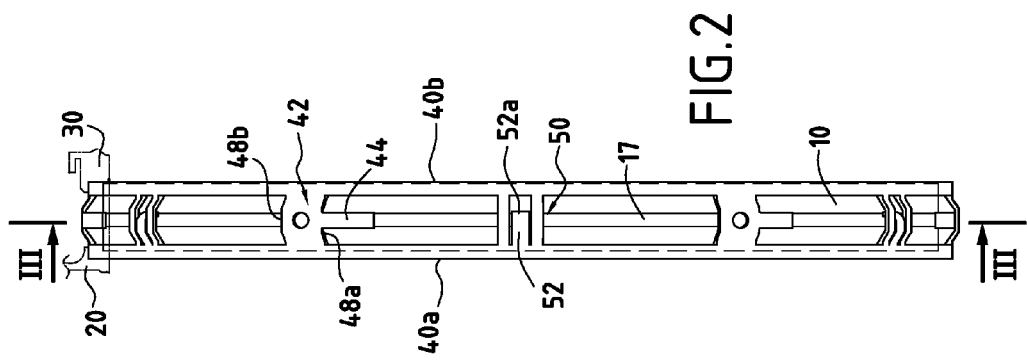

TURBINE RING ASSEMBLY FOR GAS TURBINE

BACKGROUND OF THE INVENTION

The invention relates to turbine rings for gas turbines, whether industrial gas turbines or gas turbines forming aeroengines.

In a gas turbine, a turbine ring defines a flow section at a rotary wheel of the turbine for a stream of hot gas passing therethrough. In order to ensure the best possible efficiency, it is important to avoid gas passing directly between the tips of the blades of the turbine wheel and the inside surface of the ring. Thus, in the usual way, a turbine ring is provided on its inside face with a layer of abradable material with which the turbine tips can come into contact without significant damage under the effect of dimensional variations of thermal origin or as the result of the centrifugal force that is applied to the blades.

Turbine rings are usually made as a plurality of adjacent sectors of metal material.

For example, document U.S. Pat. No. 6,758,653 proposes replacing the metal material of the turbine ring sectors by a thermostructural composite material, and more particularly by a ceramic matrix composite (CMC) material. Such a material presents mechanical properties that make it suitable for constituting structural elements and also has the ability to conserve these properties at high temperature, while presenting density that is much lower than that of the metal materials commonly used in such an application.

It is therefore attractive to replace the metal material of the turbine ring sectors with a CMC material. Nevertheless, it is necessary to design an assembly for the ring sectors that is rather complex in order to accommodate the difference between the coefficients of expansion of a CMC material and of the material of a metal casing in which the ring sectors are assembled, and while minimizing leaks against adjacent sectors. Such an assembly of CMC ring sectors in a metal ring is described in document EP 1 350 927.

Document GB 2 343 224 shows a CMC ring of C-shaped section with curved ends that press against outwardly-directed radial surfaces of a metal annular block, which ends are kept pressed against these surfaces by resilient elements. It is therefore necessary to make the CMC ring in a shape that is relatively complex and to use a metal support block that is segmented.

Document US 2005/158168 discloses a CMC ring of U-shaped section with ends that are connected to lateral faces of an annular metal block by means of connection parts of a special design that accommodates relative movement. In order to enable the CMC ring to be assembled, either the ring or the annular metal support block must be made as a plurality of annular segments.

OBJECT AND SUMMARY OF THE INVENTION

An object of the invention is to propose a simplified assembly for a turbine ring made of CMC material that also minimizes gas leakage between the outside of the ring and the flow section through the ring for the stream of hot gas.

This object is achieved by a turbine ring assembly for a gas turbine, the assembly comprising:

a complete ring comprising a single piece of ceramic matrix composite material (CMC), the ring having opposite lateral faces;

a metal structure for supporting the CMC ring, the structure comprising first and second metal annular supports having inner lateral faces that are situated facing opposite lateral faces of the CMC ring, the CMC ring being mounted between the first and second annular supports in such a manner as to allow differential expansion at least in a radial direction between the CMC ring and the annular supports;

means for centering the CMC ring; and at least one element for preventing the CMC ring from turning about its axis.

Thus, with a complete CMC ring as a single part placed between two annular supports that may each of them also constitute a single part, i.e. without segments, the structure of the turbine ring assembly is simplified and any leakage between ring sectors is avoided. In addition, using a CMC material makes it possible to reduce cooling requirements, thereby reducing requirements in terms of cooling air flow.

In a first embodiment, the means for centering the CMC ring comprise elastically-deformable tongues carried by the metal structure and pressing against the CMC ring. The deformable tongues may press in recesses formed in the surface of the CMC ring to prevent turning of the CMC ring, and they may extend circumferentially.

Advantageously, the CMC ring is kept pressing laterally against a face of one of the metal annular supports by applying a force. The CMC ring may be caused to press laterally by means of elastically-deformable fingers carried by the support structure and pressing against a portion in relief of the outer surface of the CMC ring.

The elastically-deformable tongues and fingers may be carried by a metal hoop surrounding the CMC ring and having lateral annular portions engaged in grooves formed in the inner lateral faces of the annular supports.

In a second embodiment, the CMC ring is centered by frustoconical bearing surfaces formed on the lateral faces of the CMC ring and on the inner lateral faces of the annular supports between which the CMC ring is placed.

Advantageously, in either embodiment, a sealing gasket is interposed between at least one of the lateral faces of the CMC ring and the facing inner lateral face of a metal annular support.

Also advantageously, a layer of abradable material is provided on the inside surface of the CMC ring.

The material of the CMC ring may be a composite material having a self-healing ceramic matrix. It may also be provided with a coating forming an environmental barrier against corrosion.

The CMC ring may include fiber reinforcement made by winding superposed layers of a fiber texture, which layers are bonded to one another, e.g. by needling, or it may be formed by a woven fiber texture that is closed, e.g. by stitching.

BRIEF DESCRIPTION OF THE DRAWINGS

The invention can be better understood on reading the following description made by way of non-limiting indication with reference to the accompanying drawings, in which:

FIG. 2 is a lateral elevation view of the metal hoop in which the CMC ring is mounted in the FIG. 1 embodiment;

FIG. 3 is a section view on plane III-III of FIG. 2, also showing the CMC ring;

DETAILED DESCRIPTION OF EMBODIMENTS OF THE INVENTION

A first embodiment of a turbine ring assembly in accordance with the invention is described with reference to FIGS. 1 to 8.

Figure 1:
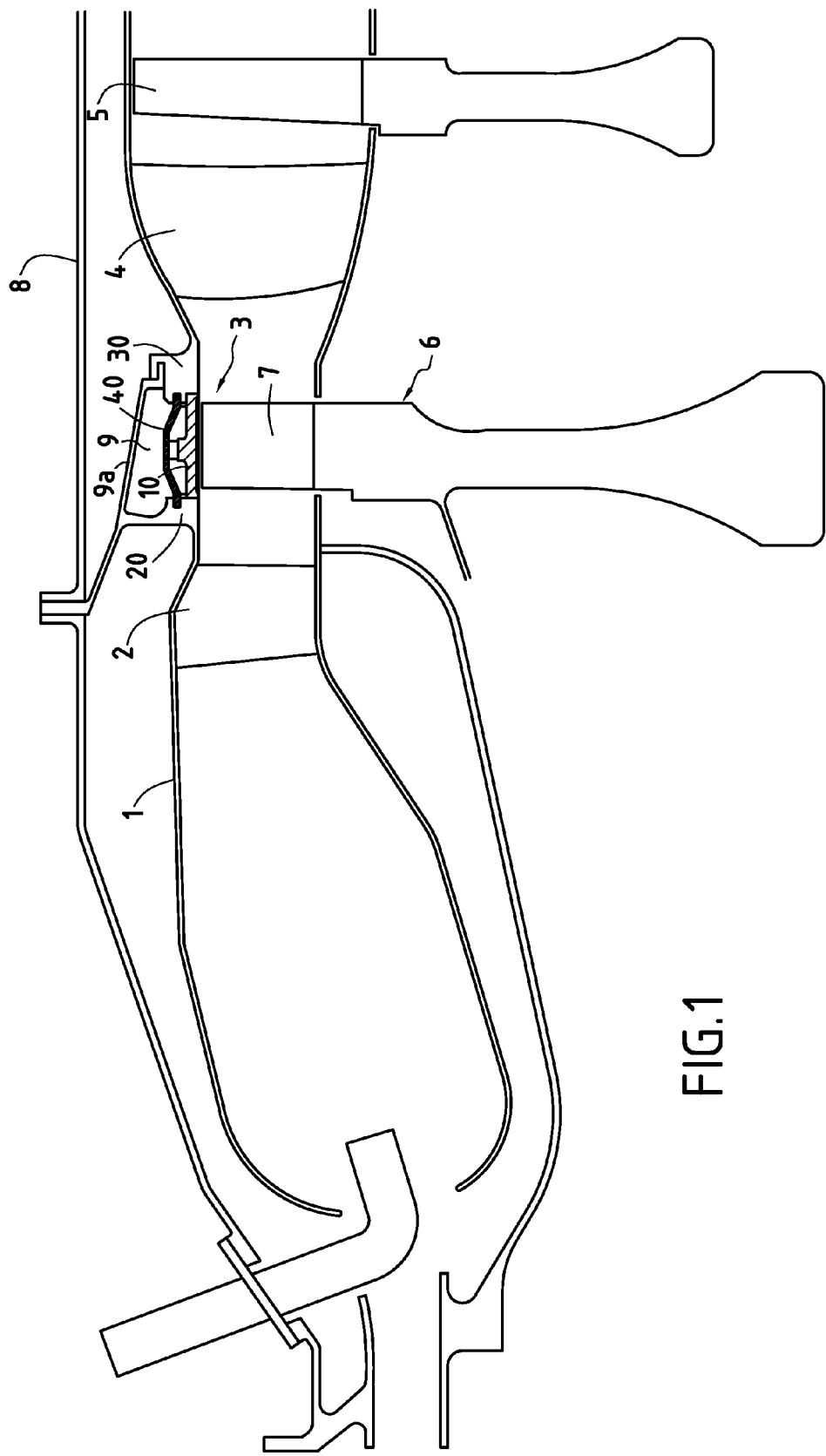
FIG. 1 is a highly diagrammatic fragmentary axial half-section view showing a first embodiment of a turbine ring assembly of the invention incorporated in its environment in a gas turbine.
Figures 4, 5:
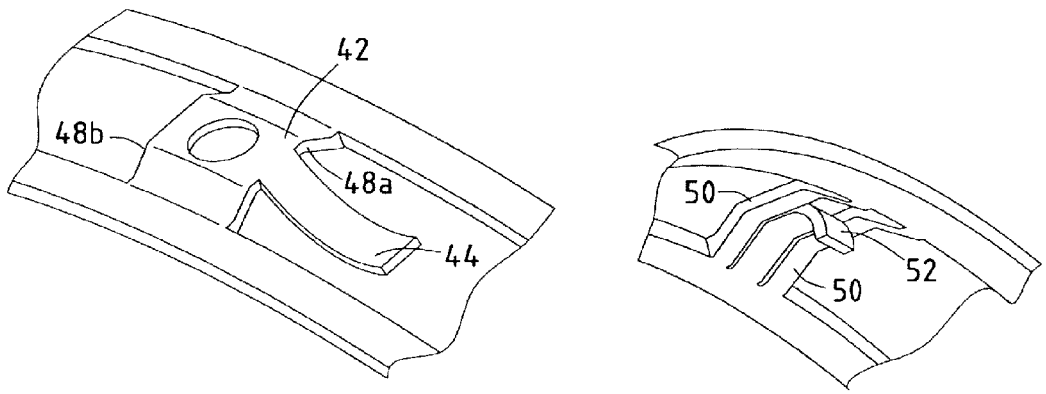
FIGS. 4 and 5 are perspective views showing details of FIG. 2.

FIG. 1 shows, in highly diagrammatic manner, and from upstream to downstream in the flow direction of gas through a gas turbine: a combustion chamber 1; a turbine nozzle 2 placed at the outlet from the combustion chamber; a high pressure (HP) turbine 3; a flow straightener 4; and a first stage of a low pressure (LP) turbine 5.

The HP turbine 3 comprises a turbine wheel 6 that is movable in rotation and that carries blades 7, and a turbine ring assembly.

The turbine ring assembly comprises a turbine ring 10 that is complete, i.e. it is not interrupted and forms a single part, being made of CMC material. The CMC ring 10 is supported by a metal support structure comprising a first annular support or upstream annular support 20, and a second annular support or downstream annular support 30, between which the ring 10 is placed and held, together with a metal hoop 40 surrounding the ring.

The metal supports 20 and 30 form complete rings that are not segmented and they are connected to a turbine casing 8. An annular space 9 is formed outside the ring 10 between the supports 20 and 30, being defined by a bottom wall 9a. Cooling air is delivered into the annular space 9 in well-known manner.

Figure 6:
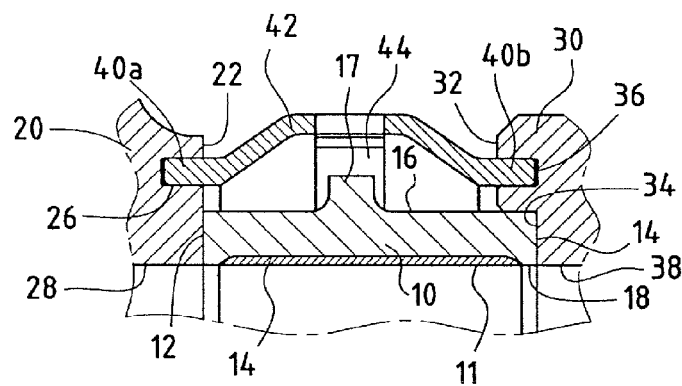
FIGS. 6 and 7 are fragmentary axial section views on a larger scale on planes VI-VI and VII-VII of FIG. 3, also showing fragments of the ring support and its metal hoop.
Figure 7:
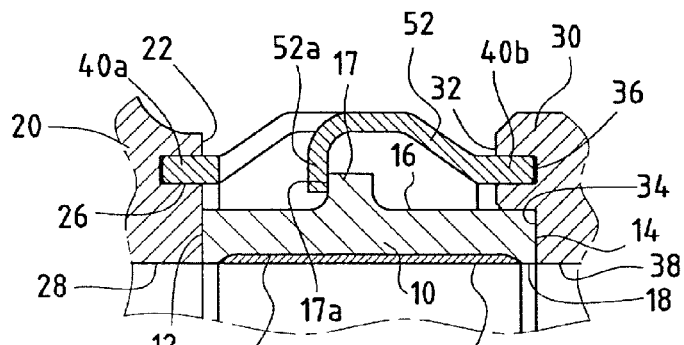

As shown in particular in FIGS. 6 and 7, the annular support 20 presents an inner radial lateral face 22 facing a radial lateral face 12 of the ring 10. The opposite radial lateral face 14 of the ring 10 comes into abutment against a facing radial surface defined by the end 34 of a step formed in the inner radial lateral face 32 of the annular support 30, extending from the inside surface 38 of the annular support 30.

The metal hoop 40 surrounding the ring 10 (see also FIGS. 2 and 3) comprises two lateral annular portions 40a and 40b interconnected by tabs 42 and 50. The lateral annular portions 40a and 40b engage in circumferential grooves 26 and 36 formed in the facing inner faces 22 and 32 of the annular supports 20 and 30.

The tabs 42 carry elastically deformable tongues 44 (see in particular FIGS. 2, 4, and 6) that are applied with prestress against the outside peripheral surface 16 of the ring 10. In the example shown, the tongues 44 extend in a circumferential direction, presenting a curved profile and pressing against the ring 10 via their concave faces in recesses 16a of complementary shapes formed in the surface 16. In a variant, the tongues could be curved at their ends to form a lug engaged in a groove formed in the surface of the CMC ring. The tongues 44 project from the middle portion of one of the sides 48a, 48b of the tabs 42, from the side 48a in the example shown.

Because of their capacity for elastic deformation, the tongues 44 can absorb differences in dimensional variation in the radial direction between the metal annular supports 20, 30 and the CMC ring 10. At high temperature, the annular structures 20, 30 tend to expand to a greater extent than does the ring 10. Since the tongues 44 are pressed against the periphery of the ring 10 with prestress, they enable the ring to be kept centered in the desired position, i.e. with the axis of the ring 10 coinciding continuously with the axis of the supports 20 and 30. Furthermore, since they press in recesses formed in the periphery of the ring 10, the tongues 44 oppose any turning of the ring 10 relative to the hoop 40.

The number of tabs 42 is selected to be not less than three. In the example shown, this number is six. Also preferably, the tabs 42 are placed regularly around the ring 10.

Second tabs 50 (see in particular FIGS. 2, 5, and 7) carry elastically deformable tongues 52 having curved ends 52a that press against a lateral face 17a of a circumferential rib 17 on the outside peripheral surface 16 of the ring 10 so as to press the lateral face 14 of the ring 10 against the end of the step 34 in the annular support 30. By way of example, the tongues 52 are cut out from the middle portions of the tabs 50 and they extend axially. It should be observed that the housings 16a in which the tongues 44 press are formed here in the rib 17, which is continuous.

By keeping the ring 10 pressed against the downstream annular support 30, in the step 34, the tongues 52 serve to minimize leaks between the flow section for the hot gas stream inside the ring and the outside thereof. Thus, in the present embodiment of a turbine ring assembly with cooling by feeding air to the outside of the turbine ring, leakage of cooling air into the hot gas flow section is limited. If so desired, an annular sealing gasket could be inserted between the ring 10 and the support 30, in which case the step 34 need not be necessary.

The number of tabs 50 is preferably selected to be not less than three. In the example shown, this number is six. Also preferably, the tabs 50 are distributed regularly around the ring 10.

Figure 8:
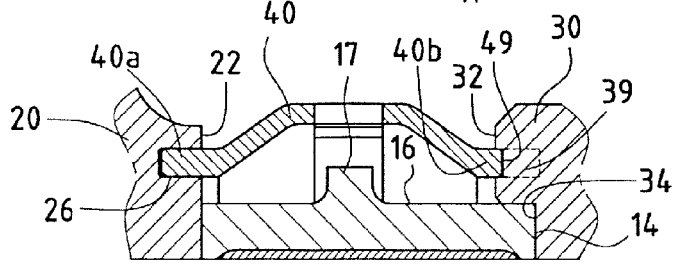
FIG. 8 is another fragmentary axial section view of the turbine ring assembly in the first embodiment of the invention.

The metal hoop 40 is prevented from turning relative to the annular supports 20, 30. As shown in FIG. 8, this may be achieved by at least one tooth 39 projecting into the annular groove 36 of the support 30 and engaged in a notch 49 formed in the annular portion 40b. A similar configuration could be provided for the support 20.

On its inside peripheral surface 18, the ring 10 is provided with a layer 11 of abradable material. In the example shown (see in particular FIGS. 6, 7, and 8), the layer 11 is placed in a setback 14 formed in the inside surface 18 over the major fraction of the width of the ring 10 in the axial direction. As a result, the exposed face of the layer 11, the portions of the inside surface 18 situated on either side of the layer 11, and the inner faces 28 and 38 of the annular supports 20 and 30 define a continuous surface for the hot gas flow section that does not present any sudden changes in diameter. Nevertheless, it is possible to envisage forming the layer of abradable material on the inside surface 18 without providing a setback therein, the layer of abradable material then projecting into the hot gas flow section.

The forces exerted by the tips of the blades of the moving wheel of the turbine when they come into contact with the layer of abradable material 11 are relatively limited, such that the tongues 44 suffice to oppose any turning of the ring 10 relative to the metal hoop 40, which hoop is prevented from turning relative to the annular support parts 20 and 30.

The function of the metal hoop 40 is to connect the ring 10 to the annular supports 20 and 30, while allowing differential expansion in the radial direction and also keeping the ring 10 centered. The metal hoop also contributes to preventing the ring 10 from turning and to keeping the ring pressed against the downstream support 30.

The metal hoop may be cut out from a metal ring, e.g. with the tabs 42, 50 and their tongues 44, 52 being performed by stamping.

The turbine ring assembly is particularly simple to mount in comparison with rings made up of sectors. The CMC ring 10 is assembled with the metal hoop 40 by deforming the tongues 44, and the metal hoop 40 is inserted between the annular supports 20 and 30.

It is possible to provide the support and centering functions for the CMC ring by means of individual tabs similar to the tabs 42 and 50 but not integral with complete annular portions such as the annular portions 40a and 40b. The individual tabs may then have their edges engaged in respective housings formed in the faces 22 and 32 of the annular supports 20 and 30.

A second embodiment of the turbine ring assembly in accordance with the invention is described below with reference to FIGS. 9 to 12.

Figure 9:
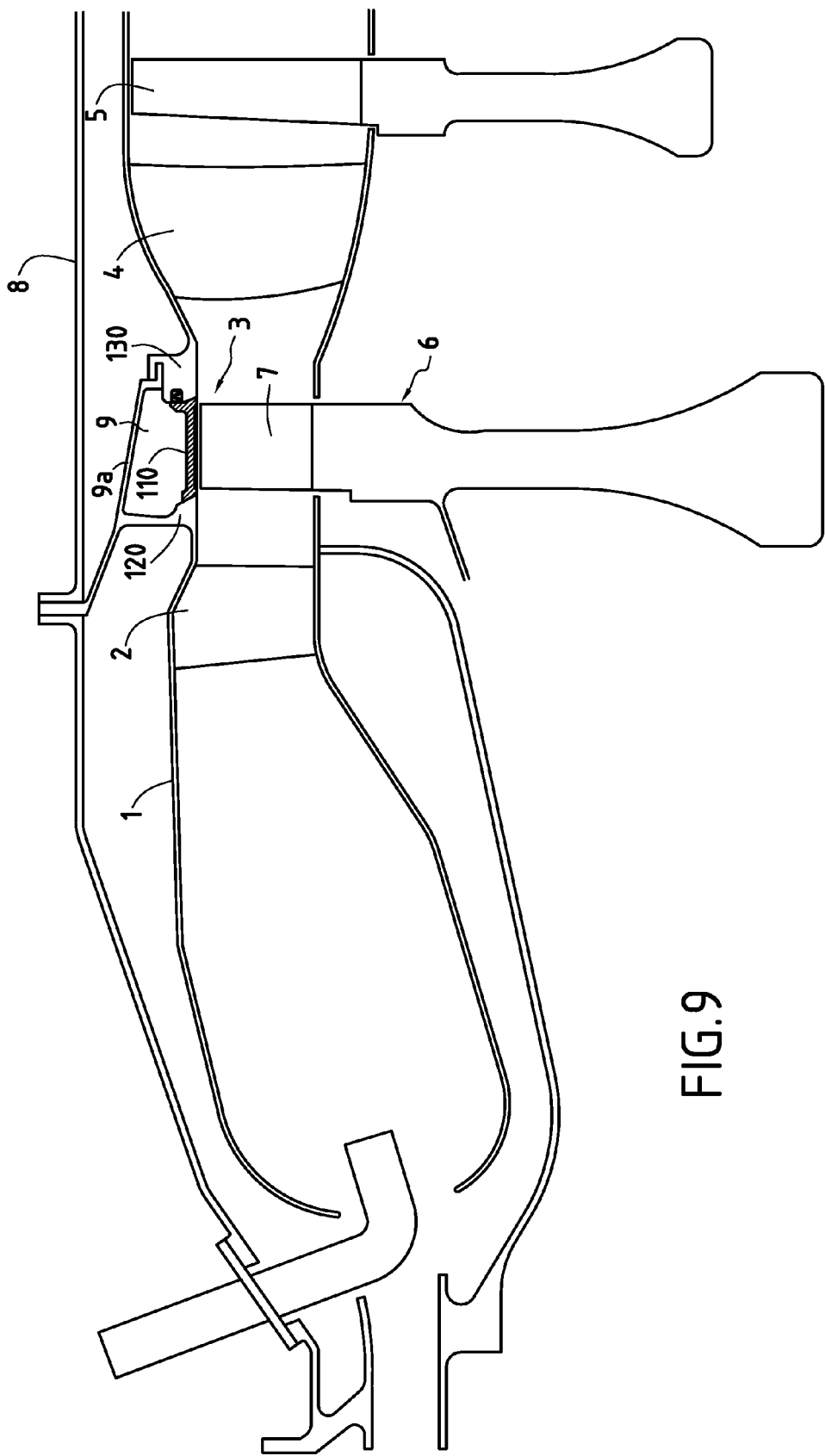
FIG. 9 is a highly diagrammatic section view showing a second embodiment of a turbine ring assembly of the invention incorporated in its environment in a gas turbine.

FIG. 9 is a fragmentary diagrammatic axial half-section view of a gas turbine that differs from FIG. 1 essentially in the shape of the turbine ring 110 and the way it is mounted between a first annular metal support or upstream metal support 120 and a second annular metal support or downstream metal support 130 within the ring assembly of the HP turbine 3, the other elements of the gas turbine being similar to those of FIG. 1 and being given the same references.

The turbine ring 110 is a complete ring made as a single piece of CMC. The annular metal supports may likewise be in the form of rings that are complete and not segmented.

Figure 10:
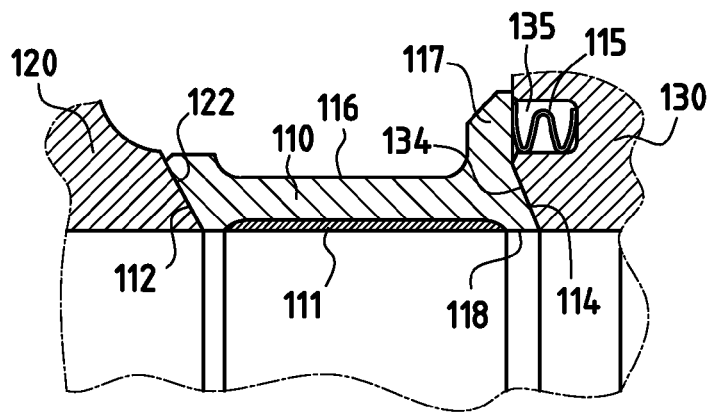
FIG. 10 is a fragmentary axial section view of the FIG. 9 turbine ring assembly.
Figure 11:
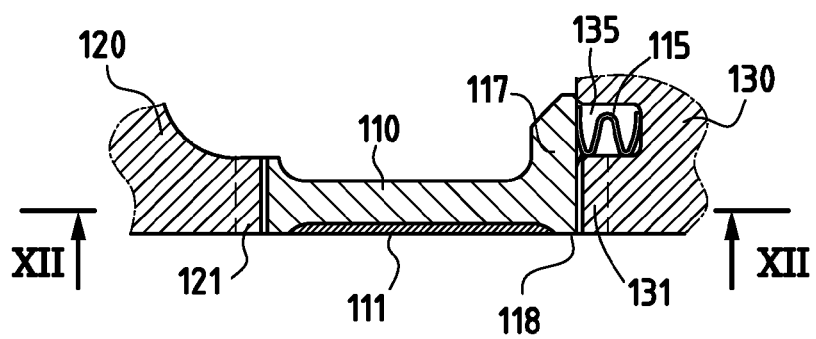
FIGS. 11 and 12 are respectively an axial section and a radial section on plane XII-XII of FIG. 11, showing a detail of the FIG. 9 turbine ring assembly.
Figure 12:
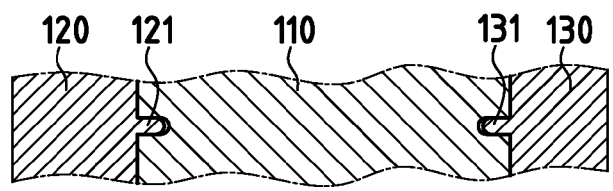

As shown in particular in FIG. 10, the inner lateral faces of the annular supports 120 and 130 present frustoconical surface portions 122 and 134. A lateral face of the ring 110 presents a surface 112 of frustoconical shape corresponding to the shape of the surface portion 122, while the other lateral face of the ring 110 presents a surface portion 114 of frustoconical shape corresponding to the shape of the surface portion 134. By contact between the frustoconical surface portions 122 and 134 and the lateral surfaces 112, 114 of the ring 110, it is ensured that the ring 110 is centered continuously while also accommodating differential dimensional variation in a radial direction between the ring 110 and the annular supports 120, 130 under the effect of temperature.

In order to limit leaks on the downstream side between the hot gas flow section defined by the inside peripheral surface 118 of the ring 110 and the outside defined by the outside peripheral surface 116, a sealing gasket 115 may be interposed between the ring 110 and the annular support 130. For this purpose, the ring 110 presents an annular rim 117 projecting from its outside peripheral surface 116 and presenting a lateral face that is connected to the frustoconical surface portion 114. The lateral face of the rim 117 constitutes a bearing surface for the sealing gasket 115, e.g. a gasket having an ω-shaped profile that is housed in a groove 135 formed in a radial surface portion of the inner side of the support 130.

The frustoconical surface portions 122, 134 of the inner faces of the annular supports 120, 130 present portions in relief, e.g. in the form of teeth 121, 131 (FIGS. 11, 12) that penetrate into corresponding housings formed in the frustoconical surfaces 112, 114 of the lateral faces of the ring 110. The ring is thus prevented from turning relative to the metal support structure formed by the supports 120, 130. The teeth 121 and the teeth 131 may be of limited number, and they are preferably angularly distributed in regular manner. There may be only one tooth 121, 131, and it is possible to provide one or more teeth on only one of the annular support parts 120, 130.

In a variant, turning may be prevented by one or more pegs engaged axially both in the ring 110 and in one or both of the annular supports 120 and 130.

On its inside peripheral surface, the ring 110 may be provided with a layer 111 of abradable material, as in the above-described embodiment.

The CMC material of the ring 10 or 110 may be of known type that is obtained by densifying a fiber preform with a ceramic matrix, the fiber preform providing the fiber reinforcement of the material. The fibers of the fiber preform are refractory fibers such as carbon fibers or ceramic fibers, e.g. silicon carbide (SiC) fibers. It should be observed that the term "ceramic" also covers compounds of the refractory oxide type.

A first step may consist in making an annular fiber preform that, after being densified by a ceramic matrix, serves to obtain an annular part from which the CMC material ring can be machined, it being understood that the machining is preferably performed at an intermediate stage of densification so that after a final densification step the fibers of the fiber preform are well protected by a matrix layer.

Figure 13:
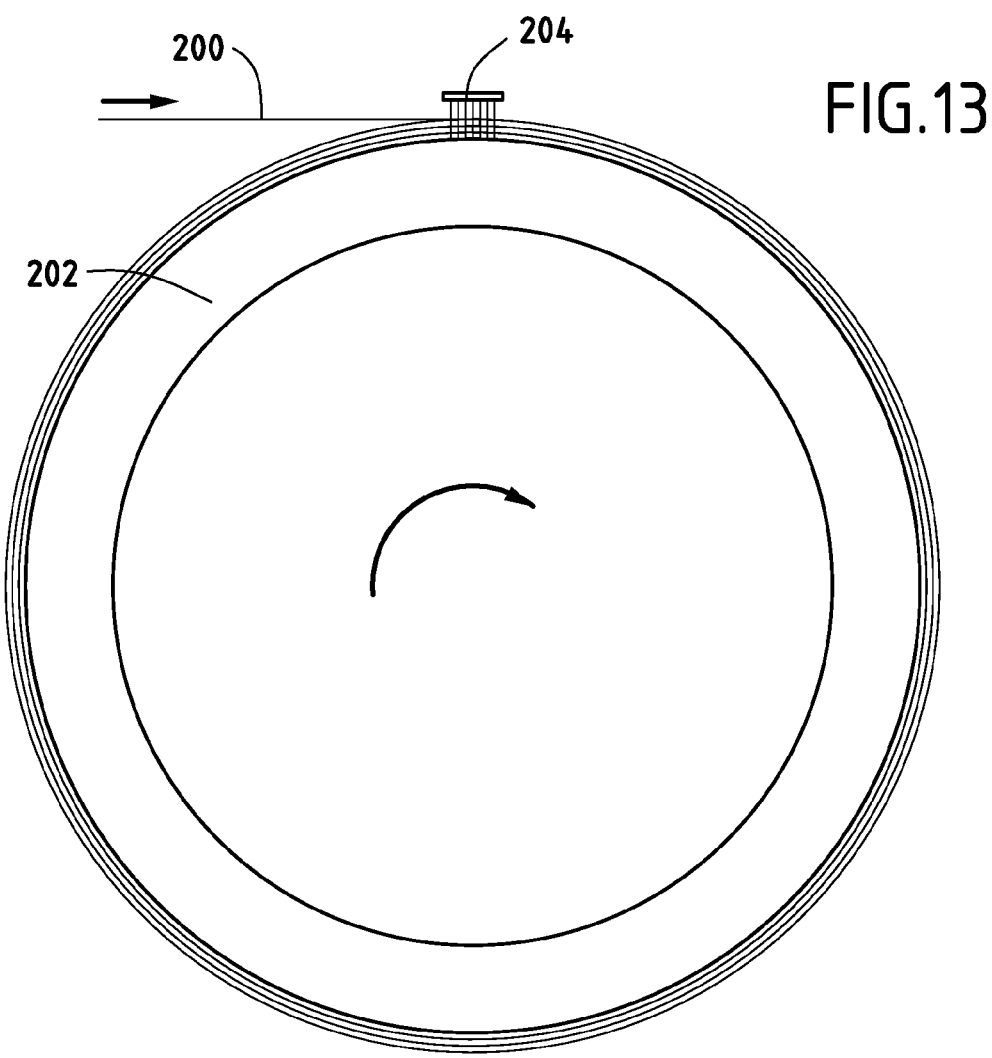
FIG. 13 is a highly diagrammatic fragmentary view showing a technique for fabricating fiber reinforcement for a CMC material ring of a turbine ring assembly of the invention.

A first embodiment of an annular fiber preform is shown diagrammatically in FIG. 13. A fiber texture strip 200 is wound on a mandrel 202 of outside diameter that is selected as a function of the diameter of the inside peripheral surface of the ring to be made. It is possible to use a fiber texture in the form of a strip of woven fabric, of a knit, or of a unidirectional or multidirectional sheet, or indeed in the form of a braid. The texture 200 is wound spirally in superposed layers that are bonded to one another, e.g. by stitching, by implanting threads, or by needling. For needling, the mandrel may be provided with a covering that enables needles to penetrate therein without damaging them. Needling may be performed after the texture 202 has been wound, or progressively as it is being wound, using a needling head 204 that extends over the entire width of the strip 200. Methods of making needled fiber preforms are described in documents U.S. Pat. No. 4,790,052 and U.S. Pat. No. 5,226,217.

Figure 14:
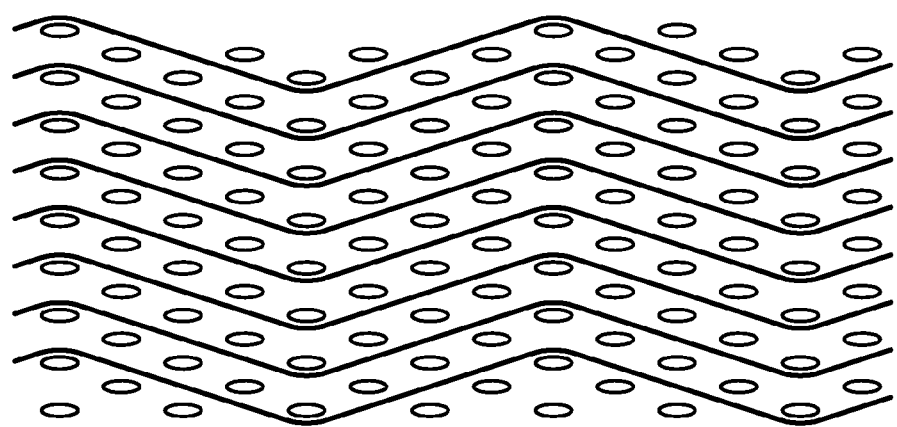
FIG. 14 is a diagrammatic fragmentary view showing a weave relating to another technique for fabricating fiber reinforcement for a CMC material ring of a turbine ring assembly of the invention.

A second technique for making an annular fiber preform consists in making a strip of desired thickness by three-dimensional weaving and connecting together the two ends of the strip so as to be able to form a complete ring. FIG. 14 is a diagram showing an interlock type weave suitable for performing the three-dimensional weaving (the weft yarns are in section). The end portions of the woven strip may be made with thickness that decreases going towards the ends so that they can be superposed without significant extra thickness in order to connect together the two end portions. A decrease in thickness can be obtained during weaving by reducing the number of layers of warp and weft yarns. The superposed end portions of the woven strip may be connected together for example by stitching the end portions together or by implanting threads. It should be observed that three-dimensional weaves other than an interlock type weave may be used, such as multilayer weaves, e.g. of the multi-plain or multi-satin type such as those described in document WO 2006/136755.

The profiles of the rings 10 and 110 in the embodiments described above are such that making an annular fiber preform of corresponding profile does not raise any particular difficulties.

The ceramic matrix may be a refractory ceramic matrix such as SiC, or advantageously it may be a "self-healing" ceramic matrix. A "self-healing" ceramic matrix is obtained by making at least one of the component phases of the matrix out of a material that, by passing to the viscous state in a certain temperature range, is capable of filling in or "healing" cracks that form in the matrix, in particular under the effect of thermal cycling. Compositions having "self-healing" properties are in particular vitreous compositions, e.g. of the aluminosilicate type, or compositions that, under the effect of oxidation, are capable of forming vitreous compositions. Matrix phases of boron carbide $B_4C$ or of an Si—B—C ternary system are precursors of vitreous compositions. The matrix may be formed by chemical vapor infiltration (CVI) and an interphase coating, e.g. of pyrolytic carbon (PyC) or of boron nitride BN may previously be formed on the fibers of the preform. The fiber preform may be kept in the desired shape by means of tooling during an initial stage of densification until the preform is consolidated, i.e. until it has been partially densified to an extent that is sufficient to enable the preform thereafter to conserve its shape without the help of tooling. Methods of making a composite material with a self-healing ceramic matrix are described in particular in documents U.S. Pat. No. 5,965,266, U.S. Pat. No. 6,291,058, and U.S. Pat. No. 6,068,930.

After densification and machining, the CMC material may be protected against corrosion by an environmental protection barrier, in known manner. Such a barrier may for example comprise an outer layer of yttrium-stabilized zirconia and a bonding underlayer of mullite. It is also known to provide corrosion resistance by means of a layer made of a compound of the type comprising an aluminosilicate of an alkaline earth metal, such as the compound $BaO_{0.75}SrO_{0.25}Al_2O_3(SiO_2)_2$ commonly known by the abbreviation BSAS. With a CMC material that contains silicon, a chemical barrier layer may then be interposed, e.g. a layer of mullite or comprising a mixture of mullite plus BSAS, while a bonding or keying underlayer of Si may be provided. A thermal barrier layer of yttrium-stabilized zirconia may be formed on the BSAS layer. Environmental barriers that are particularly suitable for CMC materials having a matrix containing silicon are described in particular in the following documents: U.S. Pat. No. 6,866,897, EP 1 416 066, U.S. Pat. No. 6,759,151, FR 06/51880, and FR 06/55578. The various layers of the environmental barrier may be deposited by physical vapor deposition, e.g. by plasma or thermal plasma sputtering, or by chemical vapor deposition (CVD), possibly with the assistance of a plasma.

The layer of abradable material may be made of a refractory oxide such as zirconia or alumina. It may be formed by physical vapor deposition, e.g. by plasma or thermal plasma sputtering. The abradable material is preferably porous. In known manner, its porosity may be controlled by depositing the material of the abradable layer together with a powder of material that can be eliminated at high temperature, e.g. polyethylene powder.

The layer of abradable material may be formed on the environmental protection barrier.

The turbine ring assembly of the invention is particularly suitable for an HP turbine of a gas turbine. Nevertheless, it can also be used for an LP turbine, or indeed for an intermediate turbine in a gas turbine having more than two stages.

The invention claimed is:

1. A turbine ring assembly for a gas turbine, the assembly comprising:
   a complete ring comprising a single piece of ceramic matrix composite material (CMC), the ring having opposite lateral faces;
   a metal structure for supporting the CMC ring, the structure comprising first and second metal annular supports having inner lateral faces that are situated facing opposite lateral faces of the CMC ring, the CMC ring being mounted between the first and second annular supports in such a manner as to allow differential expansion at least in a radial direction between the CMC ring and the annular supports;
   a metal hoop surrounding the CMC ring and having lateral annular portions engaged in grooves formed in the inner lateral faces of the annular supports;
   a plurality of elastically-deformable tongues carried by the metal hoop and pressing against the CMC ring for centering the CMC ring; and
   at least one element for preventing the CMC ring from turning about its axis.

2. A turbine ring assembly according to claim 1, wherein the elastically-deformable tongues press in recesses formed in the outer surface of the CMC ring, also constituting elements that contribute to preventing turning of the CMC ring.

3. A turbine ring assembly according to claim 1, wherein the elastically-deformable tongues extend in a circumferential direction.

4. A turbine ring assembly according to claim 1, wherein the CMC ring is kept pressing laterally against a face of one of the metal annular supports by applying a force.

5. A turbine ring assembly according to claim 4, wherein the CMC ring is caused to press laterally by means of elastically-deformable fingers carried by the metal hoop and pressing against a portion in relief of the outer surface of the CMC ring.

6. A turbine ring assembly according to claim 1, further including a layer of abradable material on the inside surface of the CMC ring.

7. A turbine ring assembly according to claim 1, wherein the material of the CMC ring is a composite material having a self-healing ceramic matrix.

8. A turbine ring assembly according to claim 1, wherein the material of the CMC ring is provided with a coating forming an environmental barrier protecting it against corrosion.

9. A turbine ring assembly according to claim 1, wherein the CMC ring comprises fiber reinforcement formed by winding superposed layers of fiber texture that are bonded to one another.

10. A turbine ring assembly according to claim 9, wherein the layers of fiber texture are bonded to one another by needling.

11. A turbine ring assembly according to claim 1, wherein the CMC ring includes fiber reinforcement formed by a closed annular woven fiber texture.

12. A turbine ring assembly according to claim 11, wherein the woven annular fiber texture is closed by stitching.

13. A gas turbine including a turbine ring assembly according to claim 1.

14. A turbine ring assembly for a gas turbine, the assembly comprising:
   a complete ring comprising a single piece of ceramic matrix composite material (CMC), the ring having opposite first and second lateral faces presenting respective first and second frustoconical surfaces;

a metal structure for supporting the CMC ring, the structure comprising first and second metal annular supports having respective first and second inner lateral faces that are situated facing the first and second opposite lateral faces of the CMC ring, respectively, the first and second inner lateral faces of the annular supports presenting respective first and second frustoconical surface portions having shapes corresponding respectively to the shapes of the first and second frustoconical surfaces of the opposite lateral faces of the ring, the first and second frustoconical surface portions of the lateral faces of the annular support being in contact with the first and second frustoconical surfaces of the lateral faces of the ring, respectively, to ensure continuous centering of the CMC ring while allowing differential expansion at least in the radial direction between the CMC ring and the annular supports; and at least one element projecting from the inner lateral face of at least one of the annular supports and penetrating into a housing formed in a facing lateral face of the CMC ring for preventing the CMC ring from turning about its axis.

15. A turbine ring assembly according to claim 14, wherein a sealing gasket is interposed between at least one of the lateral faces of the CMC ring and the facing inner lateral face of a metal annular support.

16. A turbine ring assembly according to claim 14, further including a layer of abradable material on the inside surface of the CMC ring.

17. A turbine ring assembly according to claim 14, wherein the material of the CMC ring is a composite material having a self-healing ceramic matrix.

18. A turbine ring assembly according to claim 14, wherein the material of the CMC ring is provided with a coating forming an environmental barrier protecting the CMC ring against corrosion.

19. A turbine ring assembly according to claim 14, wherein the CMC ring comprises fiber reinforcement formed by winding superposed layers of fiber texture that are bonded to one another.

20. A turbine ring assembly according to claim 19, wherein the layers of fiber texture are bonded to one another by needling.

21. A turbine ring assembly according to claim 14, wherein the CMC ring includes fiber reinforcement formed by a closed annular woven fiber texture.

22. A turbine ring assembly according to claim 21, wherein the woven annular fiber texture is closed by stitching.

23. A gas turbine including a turbine ring assembly according to claim 14.

* * * * *